United States Patent
Mohler (10) Patent No.: US 7,925,000 B2
(45) Date of Patent: Apr. 12, 2011

(54) MANAGING HELD TELEPHONE CALLS FROM A REMOTE TELECOMMUNICATIONS TERMINAL

(75) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1041 days.

(21) Appl. No.: 11/214,136

(22) Filed: Aug. 29, 2005

(65) Prior Publication Data

US 2007/0047700 A1    Mar. 1, 2007

(51) Int. Cl.
*H04M 3/00* (2006.01)

(52) U.S. Cl. ......... 379/265.01; 379/265.02; 379/265.08; 379/265.13; 379/265.14; 379/266.01; 379/266.02; 379/266.03

(58) Field of Classification Search .. 379/265.01–266.1, 379/100.05, 93.07, 220.01, 266.03, 309, 379/88.01; 370/356

See application file for complete search history.

(56) References Cited

U.S. PATENT DOCUMENTS

| 6,882,641 | B1 * | 4/2005 | Gallick et al. | 370/356 |
| 7,136,475 | B1 * | 11/2006 | Rogers et al. | 379/213.01 |
| 2004/0203674 | A1 | 10/2004 | Shi et al. | |

OTHER PUBLICATIONS

"Using your Treo 650 smartphone by palmOne", Setup information and instructions for most tasks of the Treo 650 smartphone by palmOne.

* cited by examiner

*Primary Examiner* — Vivian Chin
*Assistant Examiner* — Paul Kim
(74) *Attorney, Agent, or Firm* — DeMont & Breyer, LLC (57) ABSTRACT

A telecommunications terminal is disclosed that is capable of displaying information about calls that are on hold or queued for delivery at a data-processing system, wherein the calls are to be delivered the terminal itself. The terminal displays characteristics of each call, such as: (i) the caller's name, (ii) the calling number, (iii) the subject of the call, (iv) the urgency of the call, (v) the holding time of the call, and (vi) a telecommunications address of a messaging resource (such as email) associated with the call. The user (e.g., an off-premises representative, etc.) of the telecommunications terminal in the illustrative embodiment, in contrast with some terminals in the prior art, has the ability to remotely reorder or otherwise dispose the calls based on one or more of the call characteristics.

18 Claims, 11 Drawing Sheets

MANAGING HELD TELEPHONE CALLS FROM A REMOTE TELECOMMUNICATIONS TERMINAL

FIELD OF THE INVENTION

The present invention relates to telecommunications in general, and, more particularly, to handling one or more held calls through a user interface at a telecommunications terminal.

BACKGROUND OF THE INVENTION

A data-processing system that handles incoming telephone calls has to determine where each call is to be routed and then has to route each call to the intended recipient. One such system is a "call center," which is a physical place where incoming calls are handled by an organization. Typically, a call center has the ability to handle a large amount of call traffic concurrently, screening calls and forwarding those calls to representatives who are qualified to handle them. Call centers are typically used by businesses to support customer sales or service efforts.

Call centers use a variety of different technologies and concepts to help improve performance and the customer experience. A call center with automatic call distribution assigns the calls to representatives in the order in which they are received. Another call center might assign the call to a particular representative for a specific reason. For example, the call center of a customer support service for a pet store might assign to a first representative all calls having to do with cats and dogs, while it might assign to a second representative all calls having to do with fish. Yet another call center might be based on the concept of customer advocacy, which considers the caller's importance to the business. In supporting advocacy, the call center examines the information available on the caller, including any call history that has involved the caller, and routes the call based on the available information.

Call centers often comprise workstations with graphical user interfaces (GUI) that the organization's representatives at the call center use. When an incoming call arrives at the call center, the GUI might display a "screen pop" that reveals caller-related information, including who the caller is, what the caller might be calling about, and any call history that has involved the caller. This enables the representative who is processing the call to address the caller's need, either by taking the call directly or by forwarding the call to another representative who might be better able to handle the call. Note that there are call centers in which some of the organization's representatives are geographically dispersed, as opposed to being situated at workstations at an on-premises location of the organization. Therefore, some of the representatives to whom calls are being forwarded might be at an off-premises terminal: at home, at an airport, in a hotel room, or somewhere else.

One problem that can occur is when one or more calls are presently on hold for a particular off-premises representative. In this scenario, the call center has queued the calls for the off-premises representative who is, for example, at her cell phone. Once the calls have been queued for the representative, she has limited options for processing the calls in an effective manner, other than to take the calls directly. Furthermore, what might have seemed reasonable to the on-premises representative with respect to the assigning of calls might not be reasonable at times to the particular off-premises representative.

SUMMARY OF THE INVENTION

The present invention is a telecommunications terminal that is capable of displaying information about calls that are on hold or queued for delivery at a data-processing system, wherein the calls are to be delivered for the terminal itself. The terminal is affiliated with the data-processing system, which can be a business private branch exchange, part of a call center environment, or some other type of call-handling system. The terminal displays characteristics of each call, such as:
  i. the caller's name,
  ii. the calling number,
  iii. the subject of the call,
  iv. the urgency of the call,
  v. the holding time of the call, and
  vi. a telecommunications address of a messaging resource (such as email) associated with the call.

The user (e.g., an off-premises representative, etc.) of the telecommunications terminal in the illustrative embodiment, in contrast with some terminals in the prior art, has the ability to remotely reorder the calls based on one or more of the call characteristics. For example, if the user selects the characteristic of call urgency, by selecting the "urgency" heading on the display, then the terminal transmits a signal that directs the data-processing system to reorder the held calls in the queue in an order that reflects the urgency of the calls. That is, calls of high urgency become queued first, and calls of low urgency become queued last.

The terminal in the illustrative embodiment of the present invention also enables the user to direct the data-processing system to take a selected action on a particular call. For example, the user can drag a "sign" (e.g., a screen icon, etc.) on the display that represents the particular call over to another sign on the display that represents the selected action, and drop it there. The terminal's user has the option of dragging and dropping the call sign to one of a variety of action signs for the purpose of call disposition. Such action signs include receiving a call, transferring a call to another party (e.g., a subject matter expert, etc.), playing a prepared message to the caller, and communicating with the caller via an alternative messaging resource (e.g., email, instant messaging, etc.).

In addition, the terminal in the illustrative embodiment enables the user to specify ahead of time how to dispose certain calls automatically. For example, the terminal's user might specify ahead of time that any calls about "Ferrets" are to be transferred to a subject matter expert at a particular telephone number or address. This capability is advantageous in situations where, for example, the off-premises representative has some updated information in regards to improving customer service that the on-premises representatives might not know about.

The illustrative embodiment of the present invention comprises: (a) displaying, at a telecommunications terminal: (i) a first sign that represents a first characteristic, (ii) a second sign that represents a second characteristic, (iii) a third sign that represents a first call, and (iv) a fourth sign that represents a second call, wherein the third sign and the fourth sign are displayed in a first order that is based on the first characteristic, and wherein the first call and the second call are queued in the first order at a data-processing system for delivery to the telecommunications terminal; (b) receiving a first signal that indicates the selection of the second sign; and (c) transmitting to the data-processing system, in response to the reception of the first signal, a second signal that directs the data-processing system to queue the first call and the second call for delivery to said telecommunications terminal in a second order that is based on the second characteristic.

DETAILED DESCRIPTION

For the purposes of this specification and claims, the term "sign" is defined as a figure or device that stands for a word, a phrase, or an operation. For example, the visual representation of a telephone call identifier or call characteristic that appears on a video display is an example of a sign. An icon that stands for a telephone call is another example of a sign.

Figure 1:
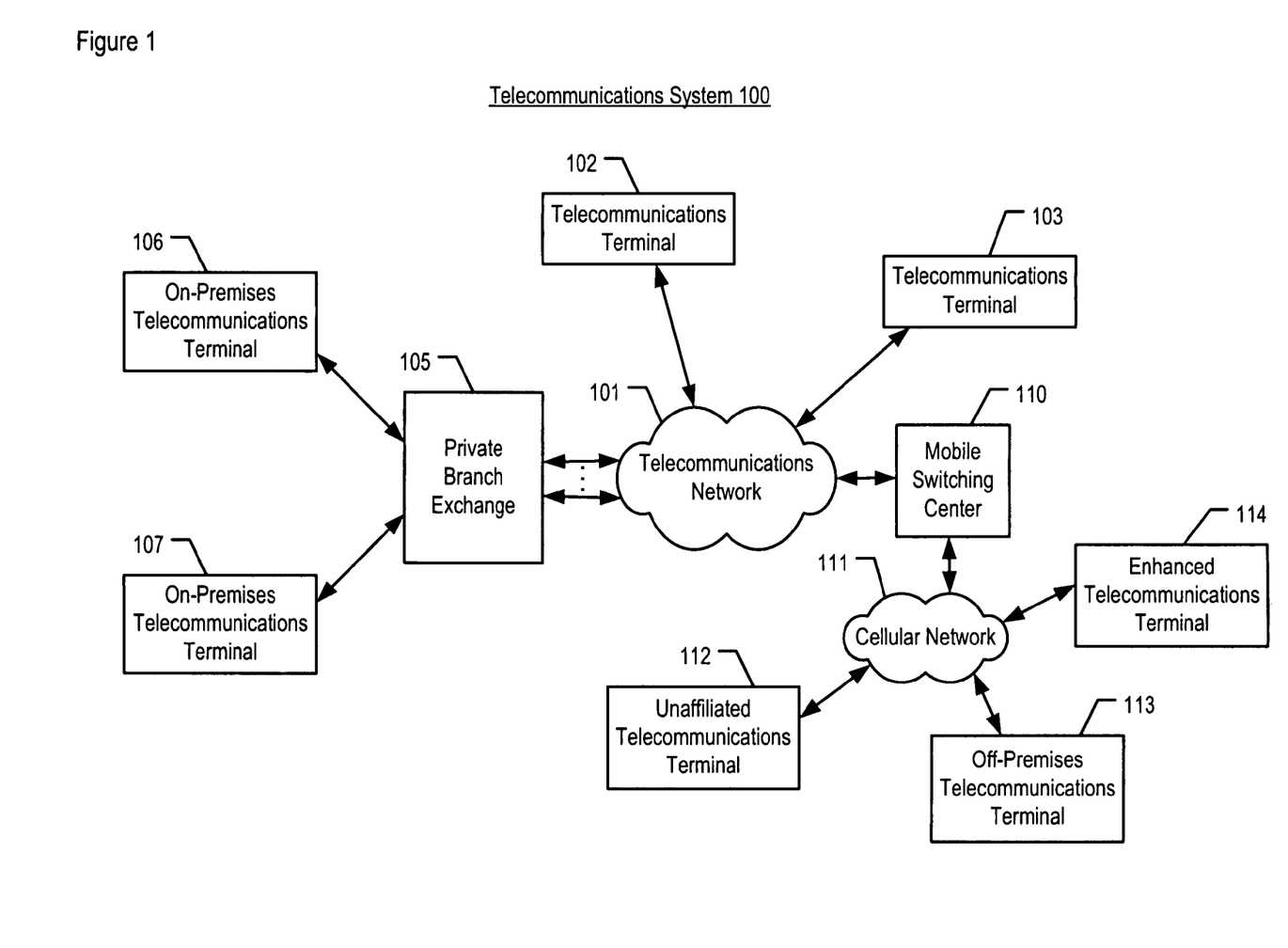
FIG. 1 depicts a schematic diagram of telecommunications system 100, in accordance with the illustrative embodiment of the present invention.

FIG. 1 depicts a schematic diagram of a telecommunications system, in accordance with the illustrative embodiment of the present invention. Telecommunications system 100 comprises:
  i. telecommunications network 101,
  ii. telecommunications terminals 102 and 103,
  iii. private branch exchange 105,
  iv. on-premises telecommunications terminals 106 and 107,
  v. mobile switching center 110,
  vi. cellular network 111,
  vii. unaffiliated telecommunications terminal 112,
  viii. off-premises telecommunications terminal 113, and
  ix. enhanced telecommunications terminal 114,
all of which are interconnected as shown.

Telecommunications network 101 is one of multiple networks that are represented in FIG. 1. Telecommunications network 101 comprises the Public Switched Telephone Network (PSTN), in accordance with the illustrative embodiment. Through Public Switched Telephone Network infrastructure, as well as through other switching and transmission infrastructure, network 101 provides telecommunications service to terminals such as telecommunications terminals 102 and 103.

Network 101 interconnects the other telecommunications networks, which include: (i) the enterprise network supported by private branch exchange 105 and (ii) cellular network 111 supported by mobile switching center 110. The enterprise network supported by private branch exchange 105 provides telecommunications service to one or more telecommunications terminals, for example terminals 106 and 107, within the enterprise area served, such as an office building or campus. Cellular network 111, which is supported by mobile switching center 110, provides telecommunications service to one or more cellular telecommunications terminals, including telecommunications terminals 112, 113, and 114.

Private branch exchange 105 is a data-processing system. Private branch exchange 105 is capable of switching incoming calls (e.g., from terminal 102, etc.) from network 101 via one or more communications paths to "on-premises" terminals, such as terminals 106 and 107. Exchange 105 is also capable of handling outgoing calls from on-premises terminals to network 101 via one or more communications paths.

Private branch exchange 105 is also capable of extending an incoming call (e.g., from terminal 102, etc.) to a telephone number of an "off-premises" terminal. From exchange 105's perspective, an "off-premises" terminal is a terminal that is accessible through network 101 while still being affiliated with exchange 105 as an extension to exchange 105's enterprise network. For pedagogical purposes, telecommunications terminals 103, 113, and 114 are the off-premises terminals in telecommunications system 100. Exchange 105 is capable of extending the incoming call to the intended off-premises terminal in addition to or independently of switching the same incoming call to an on-premises terminal within the enterprise area that exchange 105 serves.

Private branch exchange 105 is connected to telecommunications systems that are present in network 101 via communications paths that comprise Integrated Services Digital Network (ISDN) trunks, as are known in the art. As those who are skilled in the art will appreciate, other types of communications paths might connect exchange 105 to network 101. For example, exchange 105 might receive at least some of the incoming calls via a Session Initiation Protocol-based network or other Internet Protocol-based network.

It will be clear to those skilled in the art, after reading this disclosure, how to make and use alternative embodiments of the present invention in which private branch exchange 105 provides telecommunications service to a different number of on-premises terminals and a different number of off-premises terminals than those depicted.

Private branch exchange 105 is also capable of interacting with enhanced telecommunications terminal 114, as terminal 114 performs the tasks described below and with respect to FIGS. 3 through 11, in accordance with the illustrative embodiment. It will be clear to those skilled in the art, after reading this disclosure, how to make and use private branch exchange 105. Moreover, as those who are skilled in the art will appreciate, there can be alternative embodiments of the present invention in which a switch, a call center, a contact center, or other type of data-processing system than a private branch exchange interacts with enhanced telecommunications terminal 114. The data-processing systems in those alternative embodiments can inter-operate with the Public Switched Telephone Network that constitutes network 101. In some other alternative embodiments, those data-processing systems—or exchange 105, for that matter—can inter-operate with another type of network entirely (e.g., an Internet Protocol-based network, a wireless network, etc.). Putting it differently, the present invention is well suited for implementation in variety of networks: in public and private telecommunications networks, in circuit-switched and packet-switched networks, in wireline and wireless networks, and so forth.

Mobile switching center 110 is capable of switching incoming calls from network 101 to registered cellular-capable terminals, such as terminals 112, 113, and 114. Mobile switching center 110 is also capable of handling outgoing calls from cellular-capable terminals to network 101. Switching center 110 communicates with terminals 112, 113, and 114 via one or more radio base stations in cellular network 111, in well-known fashion. It will be clear to those skilled in the art how to make and use mobile switching center 110.

The telecommunications terminals in telecommunications system 100 are of various types that reflect the networks in which they operate. Those terminal types include Plain Old Telephone Service (POTS) terminals, as exemplified by terminals 102 and 103; office desksets, as exemplified by terminals 106 and 107; cell phones, as exemplified by terminals 112, 113, and 114; and so forth. As those who are skilled in the art will appreciate, the present invention is also applicable to combinations of terminals other than what FIG. 1 depicts.

The terminals in system 100 are also categorized based on their relationship to private branch exchange 105. For example, off-premises telecommunications terminals 103, 113, and 114 are capable of originating and receiving calls in well-known fashion and are affiliated with private branch exchange 105. Some of the originated or received calls are routed through exchange 105, while some of the calls are not. In the illustrative embodiment, terminal 103 is a wireline terminal and terminals 113 and 114 are cellular phones. As those who are skilled in the art will appreciate, the set of off-premises terminals in telecommunications system 100 can include other types of terminals (e.g., softphones, ISDN terminals, etc.). It will be clear to those skilled in the art how to make and use off-premises telecommunications terminals 103 and 113.

Some of the terminals in system 100 are of the same terminal type, but support different functionality. For example, telecommunications terminals 112, 113, and 114 are all cellular phones that are served by cellular network 111, yet the three terminals comprise different functionality from each other. Unaffiliated telecommunications terminal 112 is not affiliated with private branch exchange 105. Off-premises telecommunications terminal 113 is affiliated with exchange 105, as previously mentioned. Enhanced telecommunications terminal 114, another off-premises terminal, is also affiliated with exchange 105. In addition, terminal 114 is capable of performing the tasks described below and with respect to FIGS. 4 and 10, in accordance with the illustrative embodiment. It will be clear to those skilled in the art, after reading this specification, how to make and use terminal 114.

Figure 2:
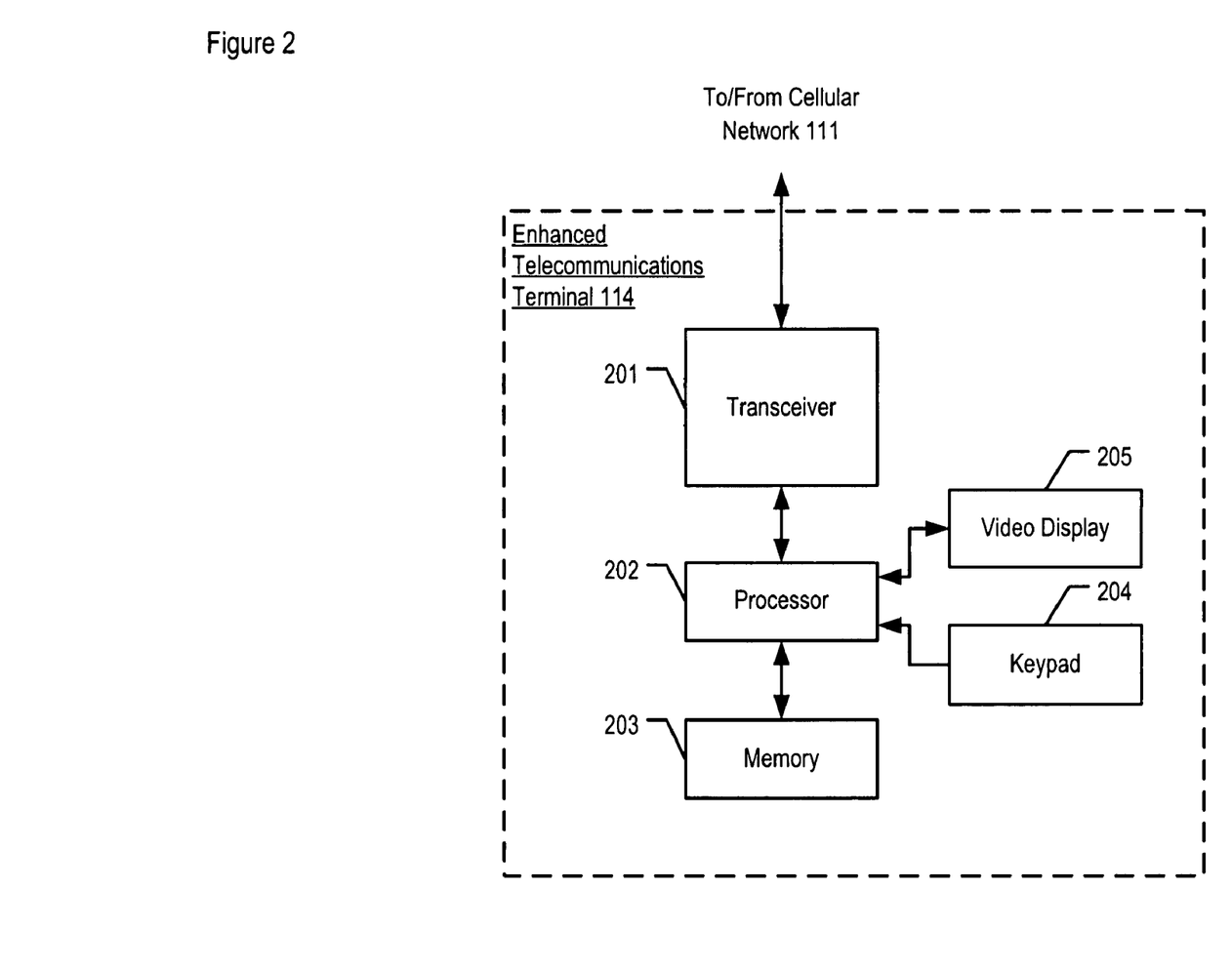
FIG. 2 depicts a block diagram of the salient components of enhanced telecommunications terminal 114 of system 100.

FIG. 2 depicts a block diagram of the salient components of enhanced telecommunications terminal 114, in accordance with the illustrative embodiment of the present invention. Although terminal 114 is the terminal represented in FIG. 2, it will be clear to those skilled in the art, after reading this disclosure, how to make and use other enhanced terminals according to what is described with respect to FIGS. 2, 4, and 10. Enhanced telecommunications terminal 114 comprises: transceiver 201, processor 202, memory 203, keypad 204, and video display 205, interconnected as shown.

Transceiver 201 comprises a receiving part and a transmitting part. The receiving part receives signals from cellular network 111, and forwards the information encoded in the signals to processor 202, in well-known fashion. The transmitting part receives information from processor 202, and outputs signals that encode this information to cellular network 111, in well-known fashion. It will be clear to those skilled in the art how to make and use transceiver 201.

Processor 202 is a general-purpose processor that is capable of: exchanging information with transceiver 201, keypad 204, and video display 205; reading data from and writing data into memory 203; executing the tasks described below and with respect to FIGS. 4 and 10; and transmitting information to video display 205. In some alternative embodiments of the present invention, processor 202 might be a special-purpose processor. In either case, it will be clear to those skilled in the art, after reading this disclosure, how to make and use processor 202.

Memory 203 is a non-volatile random-access memory that stores the instructions and data used by processor 202. In some alternative embodiments, memory 203 can be another type of non-volatile memory. Memory 203 also stores the call-related information that is received from private branch exchange 105 and to be displayed on video display 205. In addition, memory 203 stores information that is related to subject matter expertise, which is described below and with respect to task 409 of FIG. 4. It will be clear to those skilled in the art how to make and use memory 203.

Keypad 204 is a character and user-selection input device as is well known in the art that receives input from a user and transmits keypad signals representing that input to processor 202. Keypad 204 comprises fixed function keys and soft keys, as are known in the art. It will be clear to those skilled in the art how to make and use keypad 204.

Video display 205 is a display device as is well known in the art that receives a video signal and creates a visual image of the signal for a user. Video display 205 also receives input from a user (e.g., via stylus taps and strokes, etc.) and transmits signals representing that input to processor 202. It will be clear to those skilled in the art how to make and use video display 205.

Figure 3:
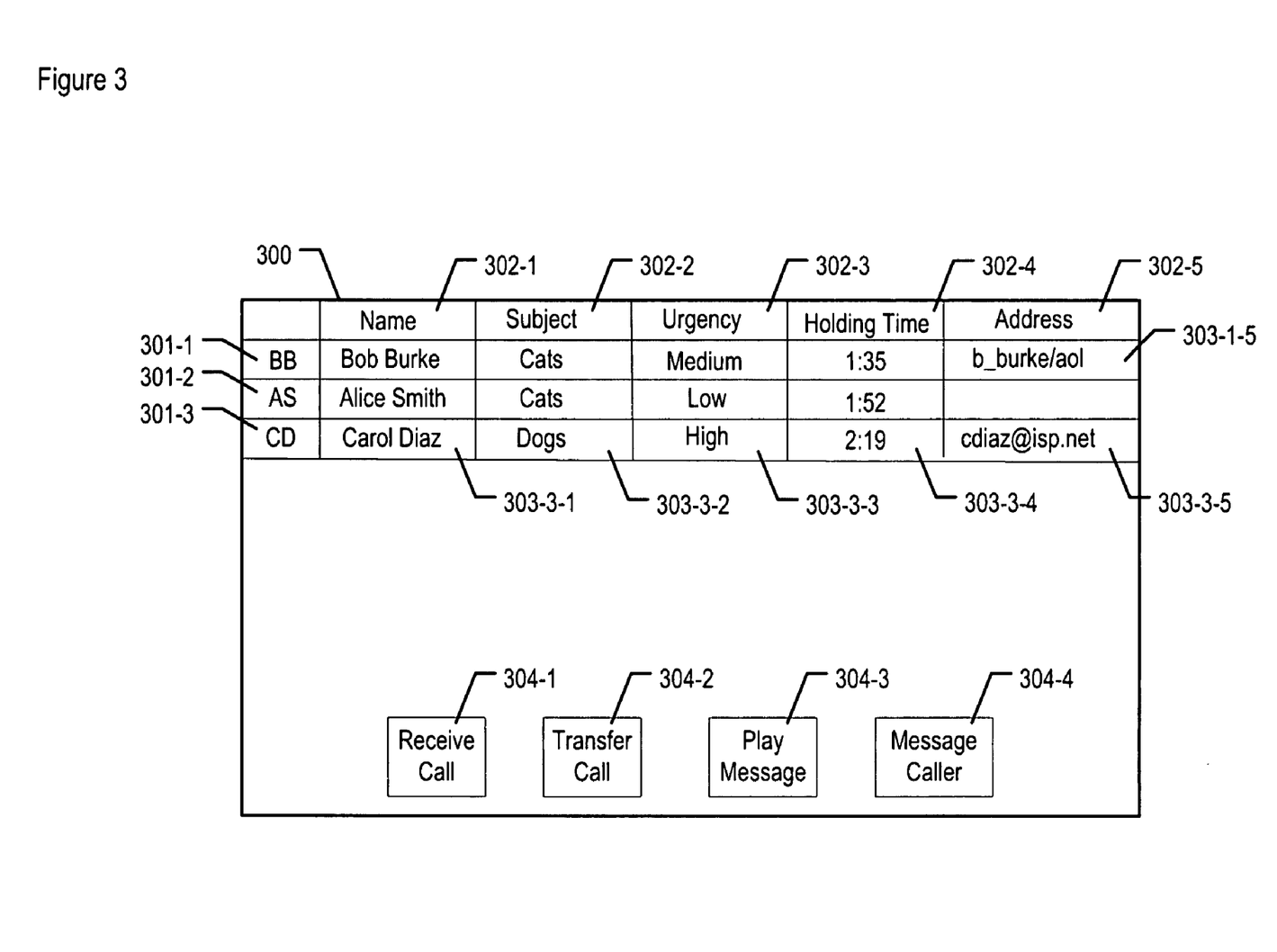
FIG. 3 depicts screen shot 300 of video display 205, wherein terminal 114 is operating in a first mode, in accordance with the illustrative embodiment of the present invention.

FIG. 3 depicts screen shot 300 of video display 205, wherein terminal 114 is operating in a first mode, in accordance with the illustrative embodiment of the present invention. Screen shot 300 illustrates three calls that are intended for enhanced telecommunications terminal 114 and currently on hold at private branch exchange 105. As those who are skilled in the art will appreciate, however, the number of calls that are on hold and displayed can vary over time. The user of terminal 114 in the example is a customer support representative for a pet store business and is forwarded calls from customers about different types of pets (e.g., dogs, cats, etc.). In some alternative embodiments, the arrangement of the displayed information and objects might be different from that depicted in FIG. 3.

Each call has a sign that represents the call. In the example depicted in FIG. 3, sign 301-1 represents the call from Bob Burke, sign 301-2 represents the call from Alice Smith, and sign 301-3 represents the call from Carol Diaz. Although each call sign in the illustrative embodiment depicts the caller's initials, in some alternative embodiments each call sign might have a different appearance. For example, each call sign might be an icon of an object (e.g., a triangle, a face, etc.).

In the example depicted in FIG. 3, the first row header depicts the characteristics of each displayed call. Sign 302-1 represents the name of the caller, sign 302-2 represents the subject of the call, sign 302-3 represents the urgency of the call, sign 302-4 represents the holding time of the call, and sign 302-5 represents the telecommunications address of a messaging resource that is associated with a call. A messaging resource that is associated with a call might be, for example, email or instant messaging. In the illustrative embodiment, the user of terminal 114 has the option of contacting the caller through the corresponding messaging resource address, if an address has been provided. A technique for using a messaging resource as an alternative means of communication with a caller is disclosed in U.S. application Ser. No. 11/179,737, which is incorporated herein by reference. As those who are skilled in the art will appreciate, in some alternative embodiments there might be other characteristics displayed for each call (e.g., calling telephone number, etc.) than those characteristics depicted in FIG. 3.

FIG. 3 also depicts the values of the characteristics of each call. Characteristic value 303-m-n, for m=1 through M and n=1 through N, wherein M and N are described below, is a sign that is an alphanumeric string, such as a word, phrase, calendrical time interval, and so forth. In some alternative embodiments, character value 303-m-n might be a symbol or symbols (e.g., one or more stars that represent the level of urgency, etc.).

Finally, FIG. 3 depicts signs that represent the actions that the user of terminal 114 might take on the calls. Sign 304-1 represents the action to deliver the call to terminal 114, sign 304-2 represents the action to transfer the call to another party, sign 304-3 represents the action to play a prepared message to the caller, and sign 304-4 represents the action to send a message to the caller (i.e., communicate with the caller by using an alternative messaging resource). As those who are skilled in the art will appreciate, there can be other actions or a different number of actions possible, in some alternative embodiments, than those depicted in FIG. 3.

Figure 4:
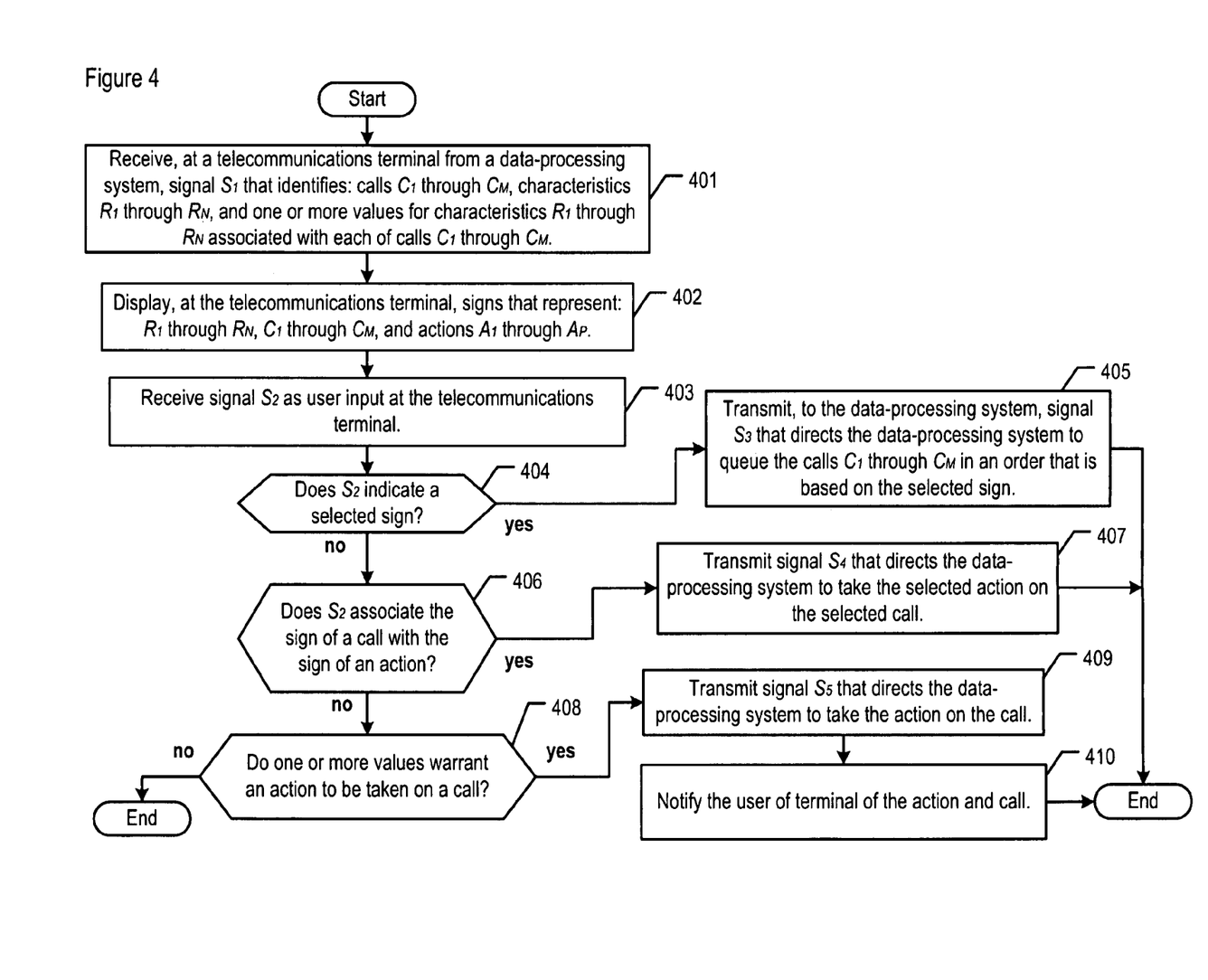
FIG. 4 depicts a flowchart of the operations of enhanced telecommunications terminal 114 as it interacts in the first mode with its user and private branch exchange 105.

FIG. 4 depicts a flowchart of the operations of enhanced telecommunications terminal 114 as it interacts in the first mode (referred to with respect to FIG. 3) with its user and private branch exchange 105 (the illustrative data-processing system), in accordance with the illustrative embodiment of the present invention. It will be clear to those skilled in the art which tasks depicted in FIG. 4 can be performed simultaneously or in a different order than that depicted.

At task 401, terminal 114 receives from exchange 105 signal $S_1$ that identifies calls $C_1$ through $C_M$, wherein M is a positive integer that is equal to the number of calls on hold at exchange 105 for terminal 114. Signal $S_1$ also conveys characteristics $R_1$ through $R_N$, wherein N is a positive integer that is equal to the number of characteristics being tracked for each call. In addition, signal $S_1$ conveys values of each characteristic $R_1$ through $R_N$ for each call $C_1$ through $C_M$. As those who are skilled in the art will appreciate, exchange 105 can acquire the information for each call (e.g., name, subject, urgency, etc.) from the caller, from another party, by generating it automatically, or through other means.

At task 402, terminal 114 displays signs that represent calls $C_1$ through $C_M$, characteristics $R_1$ through $R_N$, and the values of the characteristics for each call. Terminal 114 also displays signs that represent actions $A_1$ through $A_P$, wherein P is a positive integer that is equal to the number of actions that the user can select to apply to the calls. For example, in FIG. 3, the characteristics $R_1$ through $R_N$ are identified by signs 302-1 through 302-5 (i.e., N is equal to five). In addition, the calls $C_1$ through $C_M$ are identified by signs 301-1 through 301-3 (i.e., M is equal to three for the particular screen shot). Finally, the actions $A_1$ through $A_P$ are identified by signs 304-1 through 304-4 (i.e., P is equal to four).

At task 403, processor 202 of terminal 114 receives, in well-known fashion, signal $S_2$ that is related to user input. Signal $S_2$ originates from keypad 204 or video display 205.

At task 404, processor 202 checks whether signal $S_2$ corresponds to the user having selected a displayed sign. If signal $S_2$ corresponds to the user selecting a displayed sign, task execution proceeds to task 405. Otherwise, task execution proceeds to task 406.

At task 405, terminal 114 transmits to private branch exchange 105 signal $S_3$ that directs exchange 105 to queue calls $C_1$ through $C_M$ in an order that is based on the selected sign. Note that this new order might be different from the order in which the calls were previously queued.

Figure 5:
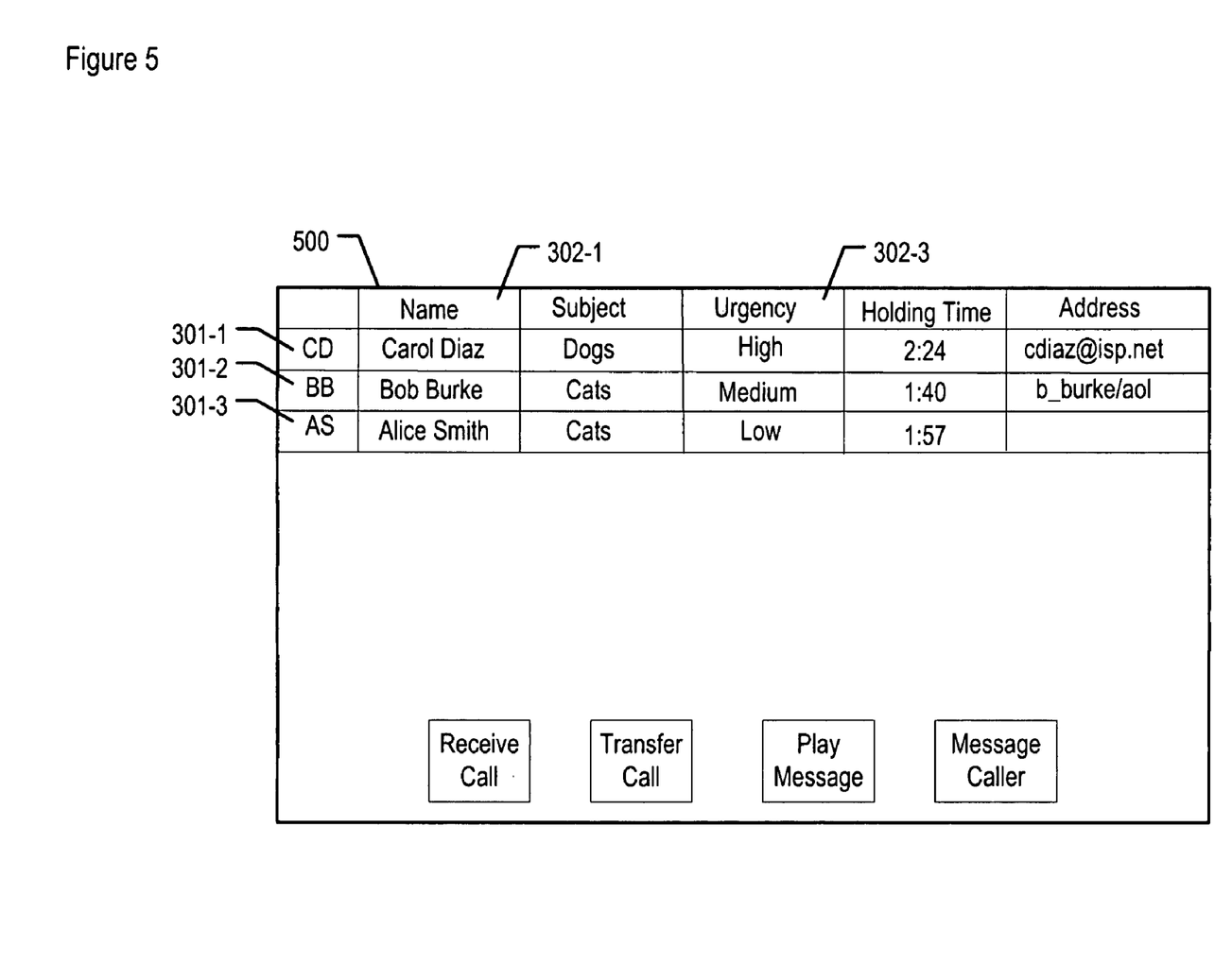
FIG. 5 depicts illustrative screen shot 500 of the first mode of operation.

For example, referring to FIGS. 3 and 5, the user of terminal 114 has selected (e.g., via a stylus tap or stroke, via keypad keys being pressed, etc.) sign 302-3 that represents the "urgency" characteristic. Previously in FIG. 3, the calls were organized by the "subject" characteristic (represented by sign 302-2): calls from customers inquiring about "cats" appeared first, followed by calls about "dogs." When the "urgency" characteristic is selected, terminal 114 transmits signal $S_3$ to exchange 105 to reorder the calls in the queue for delivery to terminal 114, based on the selection. After terminal 114 receives an updated ordering of calls from exchange 105, terminal 114 displays the call information as illustrated in FIG. 5, which reflects the "urgency" characteristic having been selected. Calls with "high" urgency are queued for delivery first, following by calls with "medium" urgency, followed by calls with "low" urgency. Note that the call holding times are also updated by exchange 105.

In the example provided above, the user of terminal 114 has selected a single characteristic (i.e., "urgency") for reordering the calls. It will be clear to those skilled in the art, after reading this specification, how to make and use terminal 114 so that (i) the user is able to select more than one characteristic for reordering the calls and (ii) signal $S_3$ indicates to exchange 105 to reorder the calls based the multiple characteristics selected by the user.

At task 406, processor 202 checks whether signal $S_2$ indicates the association of a sign that represents one of calls $C_1$ through $C_M$ with a sign that represents one of actions $A_1$ through $A_P$. If signal $S_2$ indicates an association, task execution proceeds to task 407. Otherwise, task execution proceeds to task 408.

At task 407, terminal 114 transmits to private branch exchange 105 signal $S_4$ that directs exchange 105 to take the selected action (i.e., one of actions $A_1$ through $A_P$) on the selected call (i.e., one of calls $C_1$ through $C_M$).

Figure 6:
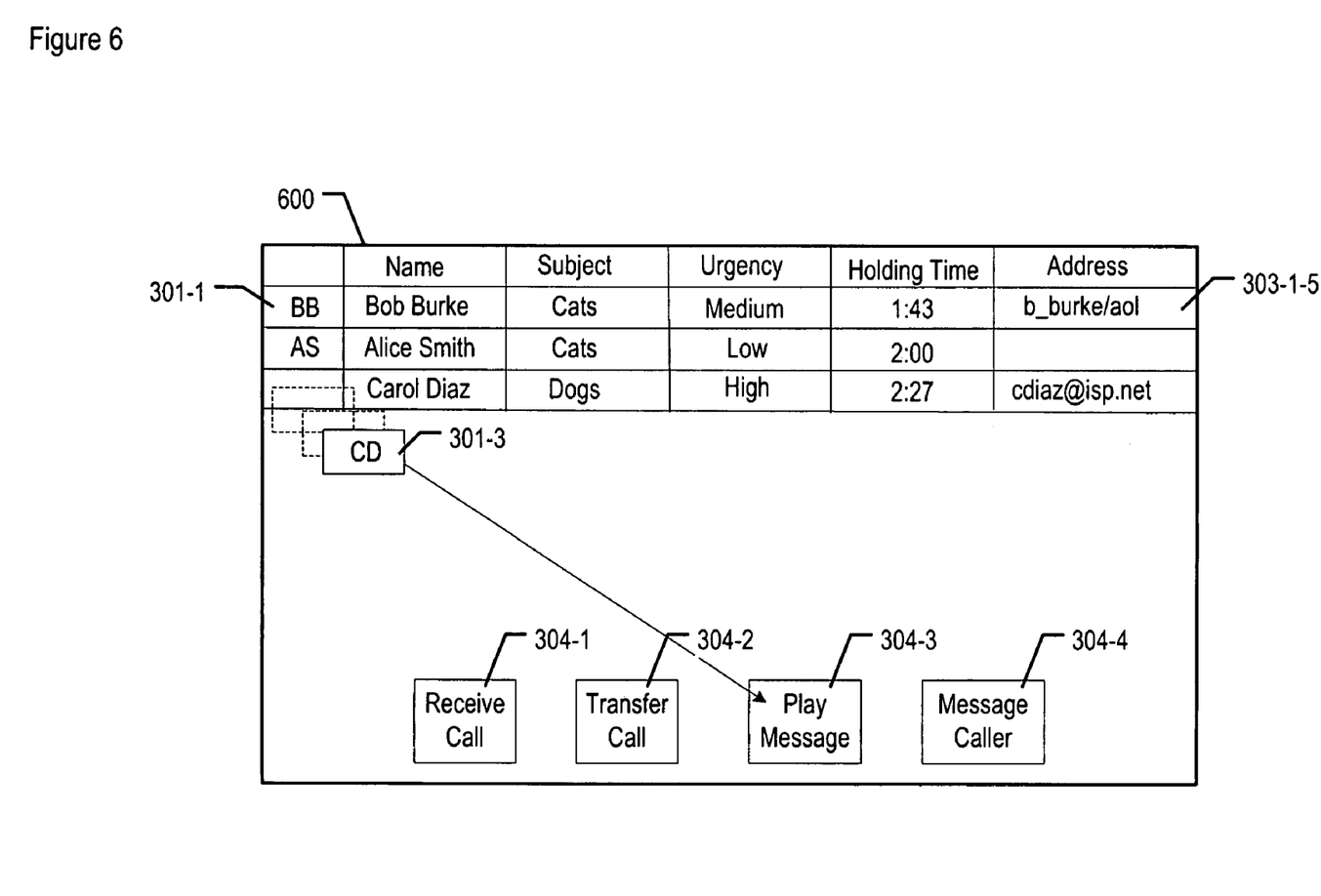
FIG. 6 depicts illustrative screen shot 600 in the first mode of operation.
Figure 7:
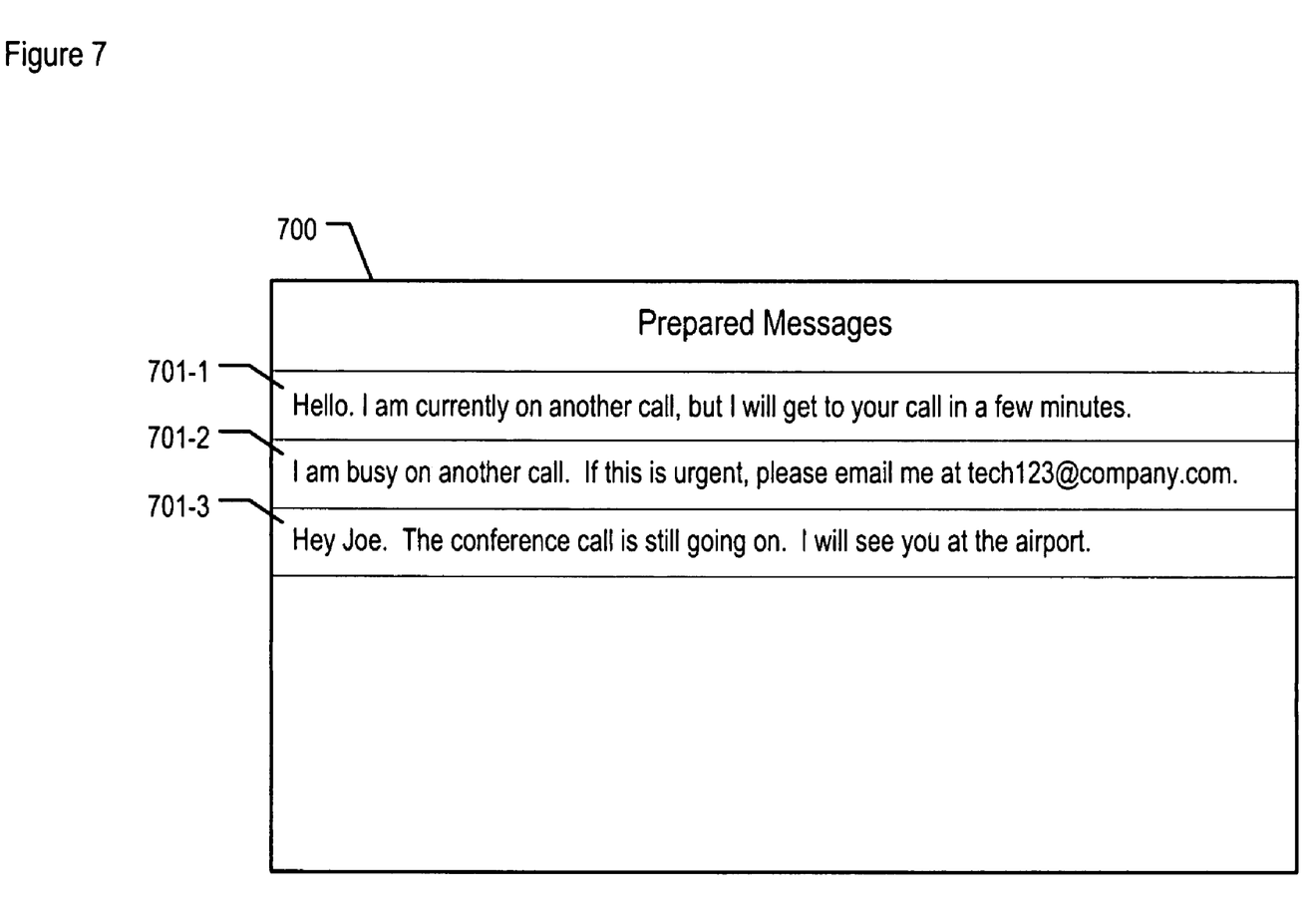
FIG. 7 depicts illustrative screen shot 700 in the first mode of operation.

As a first example, referring to FIGS. 3, 6, and 7, the user of terminal 114 wants to get a prepared audio message out to a caller, but is presently unable to talk with the caller. The user selects (e.g., via a stylus tap or stroke, via keypad keys being pressed, etc.) sign 301-3 that represents the call made by the caller of interest, "Carol Diaz." When the "CD" sign (i.e., sign 301-3) is selected and then dragged over to the "Play Message" sign (i.e., sign 304-3), as illustrated in FIG. 6, terminal 114 displays the prepared messages to choose from, as illustrated in FIG. 7. The user of terminal 114 might select, for example, sign 701-1 that represents the following message: "Hello. I am currently on another call, but I will get to your call in a few minutes." Alternatively, the user might select another prepared message, such as those represented by signs 701-2 and 701-3. Once the user selects the intended message to play to Carol Diaz, terminal 114 transmits signal $S_4$ to exchange 105 to play the prepared message to her.

As shown in the first example, terminal 114 displays a list of prepared messages when the user of terminal 114 selects the "Play Message" sign. As those who are skilled in the art will appreciate, terminal 114 displays a list of parties to transfer the call to when the user selects the "Transfer Call" sign (i.e., sign 304-2). In some embodiments, terminal 114 also displays a list of messaging launch options when the user selects the "Message Caller" sign (i.e., sign 304-4), in case the messaging address already provided (e.g., "cdiaz@isp.net", etc.) is insufficient by itself to launch the message in the way that the user wants.

As a second example, referring to FIG. 3, the user of terminal 114 is presently unable to talk with the caller of interest—in this case, "Bob Burke"—but is able to communicate with the caller via instant messaging: conveniently, the instant messaging address of the caller is known (i.e., "b_burke" in the AOL instant messaging domain). The user selects sign 301-1 that represents the call made by Bob Burke. When the "BB" sign (i.e., sign 301-1) is selected and then dragged over to the "Message Caller" sign (i.e., sign 304-4), terminal 114 transmits signal $S_4$ to exchange 105 to set up an instant messaging session using the address portrayed by element 303-1-5.

At task 408, processor 202 checks whether the current value or values of a characteristic of a call warrant that an action be taken on a call (i.e., one of calls $C_1$ through $C_M$). If an action is warranted, task execution proceeds to task 409. Otherwise, task execution ends.

At task 409, terminal 114 transmits to private branch exchange 105 a signal $S_5$ that directs exchange 105 to take the determined action on the call. Note that the determined action might be one of actions $A_1$ through $A_P$ or it might be another action.

Figure 8:
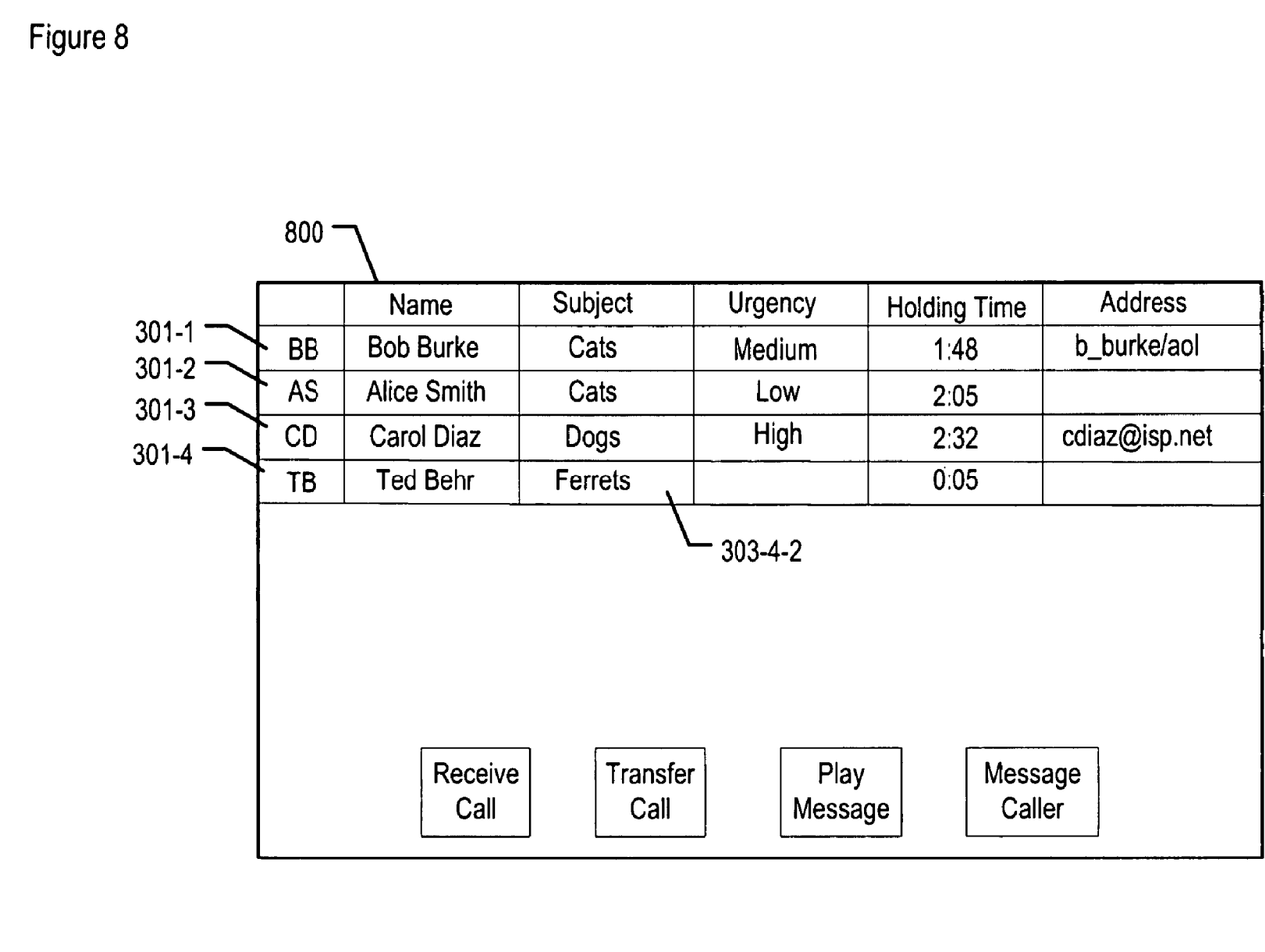
FIG. 8 depicts illustrative screen shot 800 in the first mode of operation.

For example, referring to FIGS. 3 and 8, there are first three calls on hold at exchange 105, as illustrated in FIG. 3, and then terminal 114 is notified of a new, fourth call, as represented by sign 301-4 (i.e. "TB") in FIG. 8. The subject of the new call is "Ferrets." Previously, the user programmed terminal 114 so that any time terminal 114 receives information on a held call with "Ferrets" as the subject, terminal 114 will transfer the call to the subject matter expert at a specified telephone number. Terminal 114, having checked the subject characteristic of the new call and determined that the subject (i.e., "Ferrets") matches what was specified by the user, transmits signal $S_5$ to exchange 105 to transfer the call to the subject matter expert at the telephone number specified.

At task 410, terminal 114 notifies its user of the action taken on the particular call. Terminal 114 also receives a held call update from exchange 105, which indicates that the call about Ferrets is no longer on hold for terminal 114. Task execution then ends.

Figure 9:
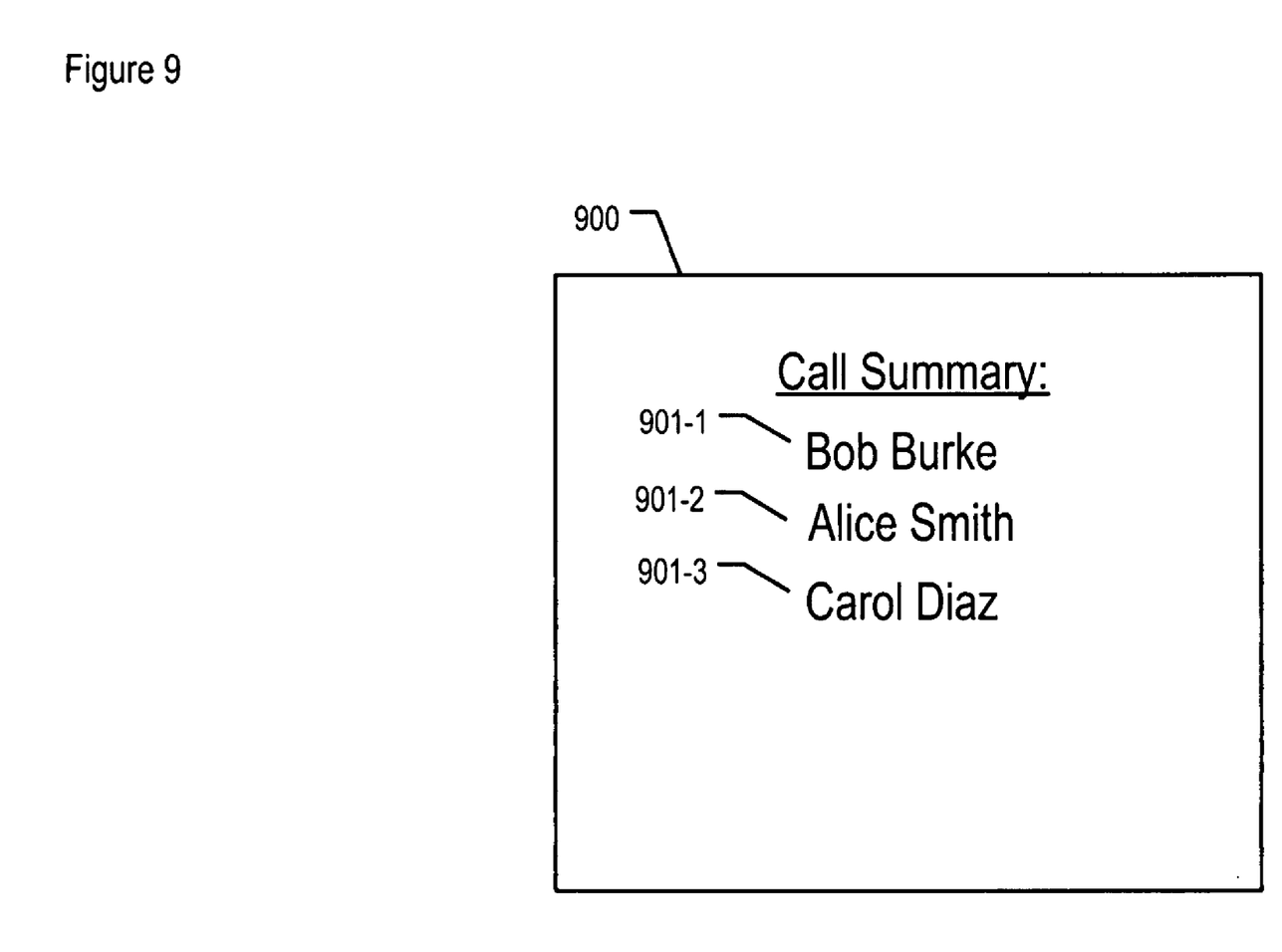
FIG. 9 depicts screen shot 900 of video display 205, wherein terminal 114 is operating in a second mode, in accordance with the illustrative embodiment of the present invention.

FIG. 9 depicts screen shot 900 of video display 205, wherein terminal 114 is operating in a second mode, in accordance with the illustrative embodiment of the present invention. The second mode might be used, for example, in conjunction with displays that are space-limited or capability-limited. Screen shot 900 illustrates three calls that are intended for enhanced telecommunications terminal 114 and currently on hold at private branch exchange 105. As those who are skilled in the art will appreciate, however, the number of calls that are on hold and displayed can vary over time. Each call is identified by its caller. In the example depicted in FIG. 9, sign 901-1 represents the name of the first caller, sign 901-2 represents the name of the second caller, and sign 901-3 represents the name of the third caller. As those who are skilled in the art will appreciate, in some alternative embodiments, the arrangement of the displayed information or how each call is identified, or both, might be different from that depicted in FIG. 9.

Figure 10:
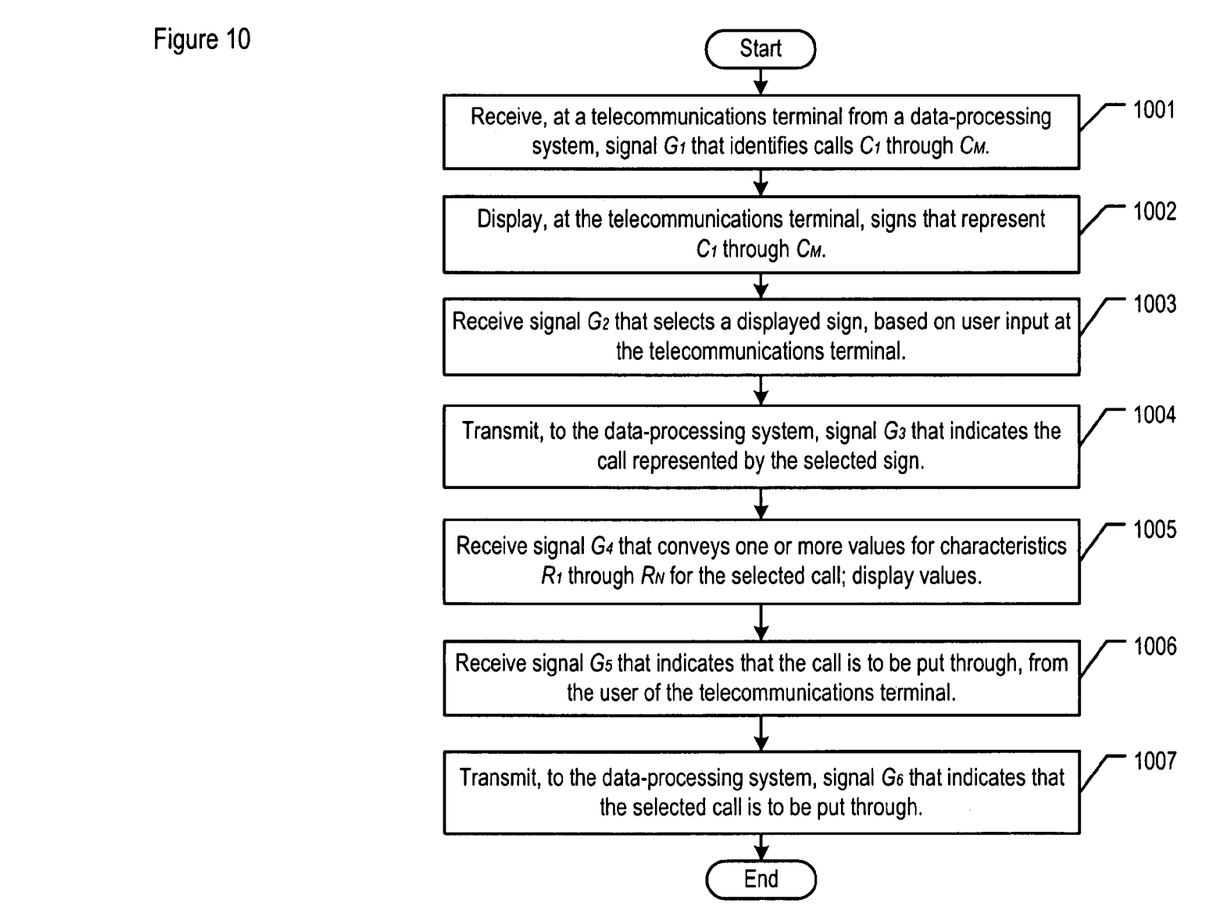
FIG. 10 depicts a flowchart of the operations of enhanced telecommunications terminal 114 as it interacts in the second mode with its user and private branch exchange 105.

FIG. 10 depicts a flowchart of the operations of enhanced telecommunications terminal 114 as it interacts in the second mode (referred to with respect to FIG. 9) with its user and private branch exchange 105 (the illustrative data-processing system), in accordance with the illustrative embodiment of the present invention. It will be clear to those skilled in the art which tasks depicted in FIG. 10 can be performed simultaneously or in a different order than that depicted.

At task 1001, terminal 114 receives, from exchange 105, signal $G_1$ that identifies calls $C_1$ through $C_M$, wherein M is a positive integer that is equal to the number of calls on hold at exchange 105 for terminal 114.

At task 1002, terminal 114 displays signs that represent calls $C_1$ through $C_M$, as depicted in FIG. 9.

At task 1003, processor 202 of terminal 114 receives a signal $G_2$ that indicates the selection of a displayed sign, in well-known fashion. Signal $G_2$ is user-related and originates from keypad 204 or video display 205.

At task 1004, terminal 114 transmits, to private branch exchange 105, signal $G_3$ that indicates the call represented by the selected sign.

Figure 11:
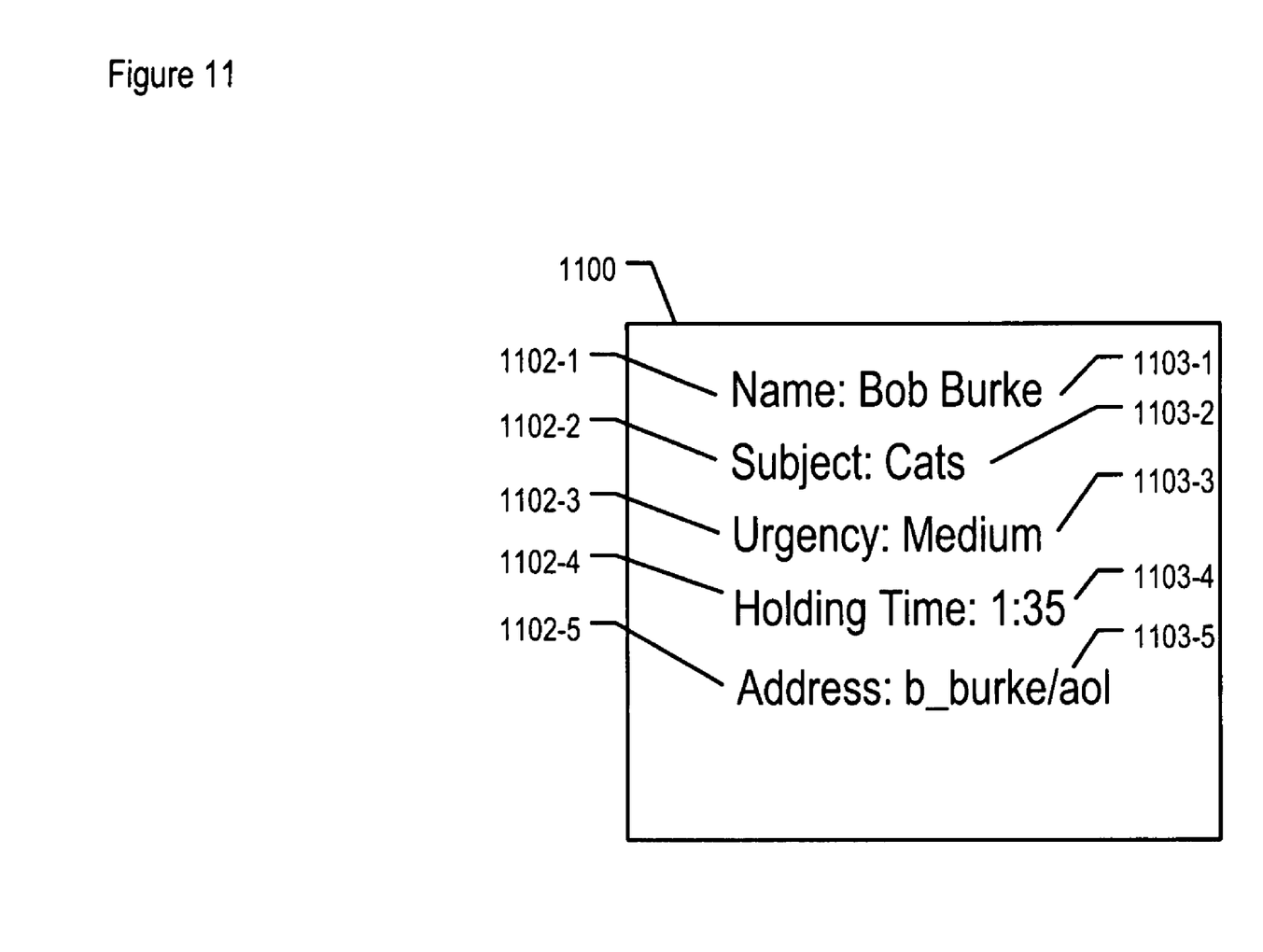
FIG. 11 depicts illustrative screen shot 1100 of the second mode of operation.

At task 1005, in response to the transmission described with respect to task 1004, terminal 114 receives signal $G_4$ that conveys characteristics $R_1$ through $R_N$, wherein N is a positive integer that is equal to the number of characteristics being tracked for the selected call. In addition, signal $G_4$ conveys values of each characteristic $R_1$ through $R_N$ for the selected. As those who are skilled in the art will appreciate, exchange 105 can acquire the information for the call (e.g., name, subject, urgency, etc.) from the caller, from another party, by generating it automatically, or through other means. Terminal 114 also displays the information conveyed by signal $G_4$. FIG. 11 depicts an example of the characteristics and characteristic values that might be displayed for a selected call from caller Bob Burke. Signs 1102-1 through 1102-5 represent characteristics $R_1$ through $R_5$, respectively, and signs 1103-1 through 1103-5 represent the values of the characteristics $R_1$ through $R_5$, respectively, for the call.

At task 1006, processor 202 of terminal 114 receives a signal $G_5$ that indicates that the call is to be put through to terminal 114, in well-known fashion. Signal $G_5$ is user-related and originates from keypad 204 or video display 205. In some embodiments, processor 202 might receive another user-related signal that indicates another type of action to take on the displayed call.

At task 1007, terminal 114 transmits, to exchange 105, signal $G_6$ that indicates that the selected call is to be put through to terminal 114.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method for a user to remotely reorder calls that are held for the user in a queue, the method comprising:
    (a) generating by a data-processing system the queue that comprises a plurality of calls, wherein the plurality of calls are to be delivered in a first order based on a first characteristic to, and only to, a telecommunications terminal;
    (b) displaying, at the telecommunications terminal:
        (i) a first sign that represents the first characteristic,
        (ii) a second sign that represents a second characteristic,
        (iii) a third sign that represents a first call, and
        (iv) a fourth sign that represents a second call,
        wherein (A) the plurality of calls comprises the first call and the second call, and (B) the third sign and the fourth sign are displayed in the first order;
    (c) receiving an input from the user at the telecommunications terminal, wherein the input selects the second sign that represents the second characteristic;
    (d) transmitting from the telecommunications terminal to the data-processing system, based on the input, a first signal that directs the data-processing system to reorder the plurality of calls in the queue according to a second order that is based on the second characteristic; and
    (e) in response to the first signal, reordering, by the data-processing system, the plurality of calls in the queue according to the second order, wherein the second order is different than the first order, and wherein the plurality of calls are to be delivered to the telecommunications terminal according to the second order;
    wherein the input from the user causes the data-processing system to reorder the plurality of calls in the queue according to the second order that is based on the second characteristic.

2. The method of claim 1 further comprising displaying, at the telecommunications terminal, the third sign and the fourth sign in the second order, based on the reception of a second signal from the data-processing system.

3. The method of claim 1 wherein the first characteristic is the subject of a call.

4. The method of claim 1 wherein the first characteristic is the urgency of a call.

5. The method of claim 1 wherein the first characteristic is the holding time of a call.

6. The method of claim 1 wherein the first characteristic is the telecommunications address of a messaging resource that is associated with a call.

7. The method of claim 6 wherein the messaging resource is email.

8. The method of claim 6 wherein the messaging resource is instant messaging.

9. A method for a user to activate a rule for disposing of calls that are queued for the user, the method comprising:
    (a) receiving by a telecommunications terminal a first input based on the rule, wherein the first input is received from the user and comprises:
        i) a selected value of a selected characteristic and
        ii) a selected action;
    (b) receiving by the telecommunications terminal from a data-processing system a first signal that identifies:
        i) a plurality of calls that are held in a queue at the data-processing system for delivery to and only to the telecommunications terminal,
        ii) at least one characteristic associated with each call in the plurality of calls, and
        iii) a value for at least one characteristic;
    (c) receiving by the telecommunications terminal a second input from the user, wherein the second input signifies that the rule is to be activated; and
    (d) transmitting by the telecommunications terminal to the data-processing system a second signal based on the second input, wherein the second signal indicates that whenever a value of the selected characteristic of a call in the queue matches the selected value of the selected characteristic, the data-processing system is to apply the selected action to the call;
    wherein the second input from the user causes the data-processing system to activate the rule for the plurality of calls that are held in the queue according to the selected action and the selected value of the selected characteristic.

10. The method of claim 9 wherein the data-processing system is to apply the selected action only while the telecommunications terminal is connected to a call that is not in the queue.

11. The method of claim 9 wherein the second user input further comprises a duration of time, and wherein the data-processing system is to apply the selected action for the duration of time.

12. The method of claim 9, wherein (i) the selected value indicates the subject of a first call and (ii) the selected action is to transfer the first call.

13. The method of claim 9, wherein (i) the selected value indicates the urgency of a first call and (ii) the selected action is to deliver the first call to the telecommunications terminal.

14. The method of claim 9 wherein the selected value indicates the holding time of a first call.

15. The method of claim 9 wherein the selected action is to deliver a message to the caller of the call.

16. The method of claim 15 wherein the message is a prepared audio message.

17. The method of claim 16 wherein the prepared audio message is based on the selected value of the selected characteristic.

18. The method of claim 16 further comprising displaying a plurality of messages at the telecommunications terminal, wherein each message in the plurality corresponds to a different prepared audio message.

* * * * *